(12) United States Patent
Marquardt et al.

(10) Patent No.: US 9,967,745 B2
(45) Date of Patent: May 8, 2018

(54) HARDWARE-TRUSTED NETWORK BEARERS IN NETWORK FUNCTION VIRTUALIZATION INFRASTRUCTURE (NFVI) SERVERS THAT EXECUTE VIRTUAL NETWORK FUNCTIONS (VNFS) UNDER MANAGEMENT AND ORCHESTRATION (MANO) CONTROL

(71) Applicant: Sprint Communications Company L.P., Overland Park, KS (US)

(72) Inventors: Ronald R. Marquardt, Woodinville, WA (US); Arun Rajagopal, Leawood, KS (US); Lyle Walter Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 232 days.

(21) Appl. No.: 15/013,898

(22) Filed: Feb. 2, 2016

(65) Prior Publication Data
US 2017/0223530 A1    Aug. 3, 2017

(51) Int. Cl.
*G06F 15/16*    (2006.01)
*H04W 12/06*    (2009.01)
(Continued)

(52) U.S. Cl.
CPC .............. *H04W 12/06* (2013.01); *H04L 41/28* (2013.01); *H04L 67/14* (2013.01); *H04W 72/02* (2013.01);
(Continued)

(58) Field of Classification Search
CPC ....... G06F 9/45558; G06F 2009/45595; G06F 9/5077; G06F 21/50; G06F 21/575;
(Continued)

(56) References Cited

U.S. PATENT DOCUMENTS 7,380,119 B2    5/2008    Bade et al.
8,065,522 B2    11/2011    Bade et al.
(Continued)

FOREIGN PATENT DOCUMENTS

| CN | 103929422 | 7/2014 |
| CN | 105210337 | 12/2015 |
| WO | 2015143610 | 10/2015 |

OTHER PUBLICATIONS

Zheng Yan, et al.; "A security and trust framework for virtualized networks and software-defined networking;" Security and Communication Networks; Mar. 26, 2015; pp. 3059-3069; vol. 9, No. 16, Section 1243; Wiley Online Library.

*Primary Examiner* — Djenane Bayard

(57) ABSTRACT

Network Function Virtualization Infrastructure (NFVI) servers execute Virtual Network Functions (VNFs) to exchange user data under the control of a Management and Orchestration (MANO) system. A Hardware-Trust (HT) server maintains hardware trust in some of the NFVI servers. The HT server exchanges NFVI/VNF execution data with the MANO system to associate executing VNFs with hardware-trusted NFVI servers. A control set of the VNFs receives a request for a hardware-trusted communication and responsively selects a network bearer supported by data VNFs. The HT server determines if the data VNFs are hardware-trusted VNFs, and if so, the HT server indicates to the control VNFs that the hardware-trusted communication may proceed. The control VNFs direct the data VNFs to transfer the hardware-trusted data communication over the selected network bearer.

20 Claims, 7 Drawing Sheets

(51) Int. Cl.
*H04W 72/02* (2009.01)
*H04L 12/24* (2006.01)
*H04L 29/08* (2006.01)
*H04W 88/18* (2009.01)
*H04W 92/02* (2009.01)
*H04L 12/715* (2013.01)

(52) U.S. Cl.
CPC .............. *H04L 45/64* (2013.01); *H04W 88/18* (2013.01); *H04W 92/02* (2013.01)

(58) Field of Classification Search
CPC ........ G06F 21/44; G06F 21/445; G06F 21/53; G06F 2009/4557; G06F 2009/45587; G06F 9/45533; G06F 21/10; G06F 21/57; G06F 9/455; H04L 12/4641; H04L 67/10; H04L 41/0896; H04L 41/12; H04L 41/5054; H04L 41/5051; H04L 45/64; H04L 41/28
See application file for complete search history.

(56) References Cited

U.S. PATENT DOCUMENTS

| | | |
|---|---|---|
| 8,505,103 B2 | 8/2013 | Song et al. |
| 9,191,865 B1 | 11/2015 | Paczkowski et al. |
| 2009/0044270 A1 | 2/2009 | Shelly et al. |
| 2009/0204964 A1 | 8/2009 | Foley et al. |
| 2014/0201374 A1 | 7/2014 | Ashwood-Smith et al. |
| 2014/0229630 A1 | 8/2014 | Narayanan et al. |
| 2014/0241247 A1 | 8/2014 | Kempf et al. |
| 2014/0317261 A1 | 10/2014 | Shatzkamer et al. |
| 2014/0344439 A1 | 11/2014 | Kempf et al. |
| 2015/0106526 A1 | 4/2015 | Arndt |
| 2017/0149838 A1* | 5/2017 | Sood ...................... H04L 63/20 |
| 2017/0161501 A1* | 6/2017 | Sood ...................... G06F 21/575 |

* cited by examiner

US 9,967,745 B2

HARDWARE-TRUSTED NETWORK BEARERS IN NETWORK FUNCTION VIRTUALIZATION INFRASTRUCTURE (NFVI) SERVERS THAT EXECUTE VIRTUAL NETWORK FUNCTIONS (VNFS) UNDER MANAGEMENT AND ORCHESTRATION (MANO) CONTROL

TECHNICAL BACKGROUND

Data communication networks exchange user data for user devices like phones, computers, and machine transceivers. The user data might be audio/video, email, web content, software, or files. The user devices are typically phones, computers, machines, and the like. The data communication networks use Network Function Virtualization Infrastructure (NFVI) servers to exchange the user data.

A Management and Orchestration (MANO) system drives the NFVI servers to execute Virtual Network Functions (VNFs) to exchange the user data. The VNFs typically comprise network elements or components of network elements that may include Long Term Evolution (LTE) systems, Internet Protocol Multimedia Subsystems (IMS), Internet Protocol (IP) routers, Ethernet switches, and the like. In Software-Defined Networks (SDNs), the VNFs may comprise SDN applications, SDN controllers, and SDN virtual data machines.

VNFs executing in NFVI servers process communication requests from user devices for various communication sessions. The communication requests might be wireless attachment data, layer 2 information, internet messaging, or some other instruction. Exemplary session requests include Radio Resource Control (RRC) signaling, Non-Access Stratum (NAS) data, Session Initiation Protocol (SIP) messaging, Session Description Protocol (SDP) fields, Internet Protocol (IP) addresses, IP ports, Multi-Protocol Label Switching (MPLS) labels, or some other request signals.

In response to a communication request, control VNFs select a network bearer for the communication session. For example, a base station VNF and a network gateway VNF may select a network bearer having three data-handling VNFs. In LTE networks, the control VNFs usually identify Access Point Names (APNs) for the communication sessions and use the APNs to select gateway VNFs.

The data communication networks also use hardware trust servers to maintain hardware trust in network elements and user devices based on trust codes that are physically embedded the network elements and user devices. To maintain hardware trust, the trust server issues trust challenges, such as random numbers, to the network elements and user devices. The network elements and user devices hash the challenges with their own physically-embedded trust codes to generate and respond with trust results. The hardware trust server then verifies these physically-embedded trust codes by hashing the random numbers and their own version of the trust codes to generate matching trust results.

Unfortunately, the NFVI servers and the MANO systems have not been effectively integrated with the hardware trust servers. The NFVI servers, MANO systems, and hardware trust servers do not efficiently establish hardware-trusted network bearers for user devices. Hardware trust servers do not efficiently trust network bearers that comprise NFVI/VNF pairs, as well as, other network elements and user devices.

TECHNICAL OVERVIEW

Network Function Virtualization Infrastructure (NFVI) servers execute Virtual Network Functions (VNFs) to exchange user data under the control of a Management and Orchestration (MANO) system. A Hardware-Trust (HT) server maintains hardware trust in some of the NFVI servers. The HT server exchanges NFVI/VNF execution data with the MANO system to associate executing VNFs with hardware-trusted NFVI servers. A control set of the VNFs receives a request for a hardware-trusted communication and responsively selects a network bearer supported by data VNFs. The HT server determines if the data VNFs are hardware-trusted VNFs, and if so, the HT server indicates to the control VNFs that the hardware-trusted communication may proceed. The control VNFs direct the data VNFs to transfer the hardware-trusted data communication over the selected network bearer.

DETAILED DESCRIPTION

Figure 1:
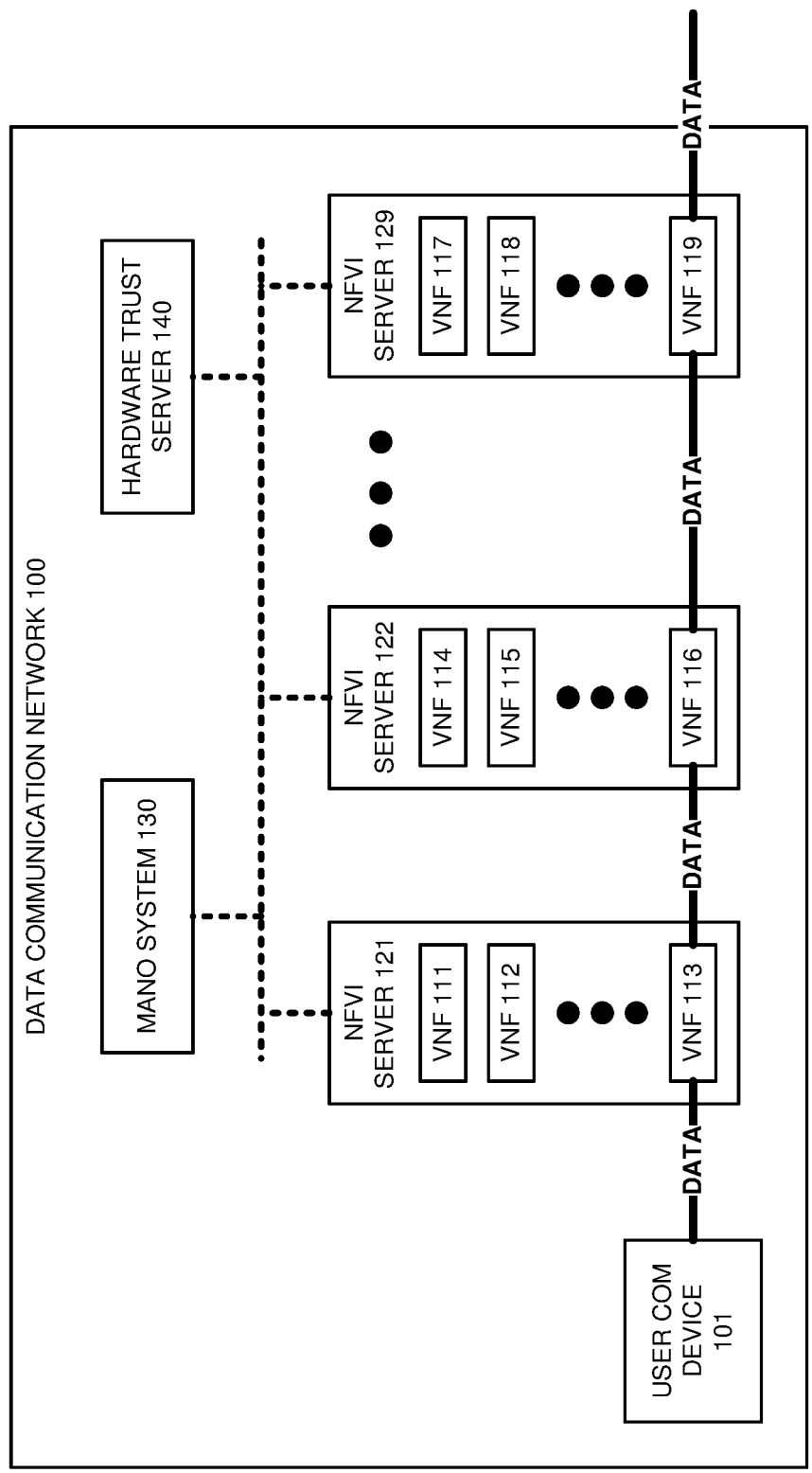
FIG. 1 illustrates a data communication network to exchange user data over hardware-trusted network bearers.

FIG. 1 illustrates data communication network 100 to exchange user data over hardware-trusted network bearers. The data exchange may support communication services like audio/video streaming, messaging, web content, file access, and the like. Data communication network 100 comprises user communication device 101, Network Function Virtualization Infrastructure (NFVI) servers 121-129, Management and Orchestration (MANO) system 130, and hardware trust server 140.

MANO system 130 drives NFVI servers 121-129 to execute Virtual Network Functions (VNFs) 111-119. NFVI servers 121-129 responsively execute VNFs 111-119 to exchange user data. VNFs 111-119 typically comprise network elements or components of network elements that include wireless base stations, network gateways, User Equipment (UE), Internet Protocol Multimedia Subsystem (IMS) servers, Internet Protocol (IP) routers, Mobility Management Entities (MMEs), and the like. In Software-Defined Network (SDN) examples, VNFs 111-119 may comprise SDN applications, SDN controllers, and SDN virtual data machines.

Hardware trust server 140 maintains hardware trust with a set of three NFVI servers 121-122 and 129 (that are shown on FIG. 1) based on trust codes that are physically embedded in the three NFVI servers 121-122 and 129. NFVI servers 123-128 (not shown on FIG. 1) would not have or would not use similar trust codes. To maintain hardware trust, trust server 130 issues trust challenges, such as random numbers, to the set of NFVI servers 121-122 and 129. NFVI servers 121-122 and 129 hash the challenges with their own physically-embedded trust codes to generate and respond with trust results. Hardware trust server 130 verifies these physically-embedded trust codes by hashing the random numbers and their own version of the trust codes to generate matching trust results. NFVI servers 123-128 do not perform hardware trust verification.

MANO system 130 and hardware trust server 140 exchange NFVI/VNF execution data to associate VNFs 111-119 and NFVI servers 121-129 based on the actual execution history. In some examples, only NFVI/VNF data for hardware-trusted systems is exchanged. The VNF/NFVI execution history specifies which NFVI servers execute which VNFs, the VNF execution times, and other VNF/NFVI usage metrics. Hardware trust server 140 then associates hardware trust with individual VNFs based on a time correlation of the VNF's execution time on a server with the hardware trust validation time of that server. In some examples, hardware trust validations are initiated for a particular VNF/NFVI pairing during VNF on-boarding and/or off-boarding with the NFVI.

Consider a scenario where VNFs 111 and 117 in NFVI servers 121 and 129 process a communication request from user communication device 101 for a hardware-trusted communication session. The communication request might be wireless attachment data, layer 2 information, internet messaging, or some other instruction. For example, the hardware-trusted session request might be a special indicator in Radio Resource Control (RRC) signaling, Non-Access Stratum (NAS) data, Session Initiation Protocol (SIP) message, Session Description Protocol (SDP) field, Internet Protocol (IP) address, IP port, Multi-Protocol Label Switching (MPLS) label, or some other instruction signal.

In response to the communication request, control VNFs 111 and 117 select a network bearer for the hardware-trusted communication session. For example, control VNF 111 may comprise a base station controller that schedules the network bearer from user communication device 101 through data VNF 113 to data VNF 116 in NFVI server 122. Control VNF 117 may comprise a gateway controller that schedules the network bearer from data VNF 116 through data VNF 119 in NFVI server 122 to an external system (not shown). In some examples, control VNFs 111 and 117 identify Access Point Names (APNs) for the hardware-trusted communication sessions and use the hardware-trusted APNs to select the network bearer in the form of hardware-trusted network access points, data machines, and gateways.

Also in response to the communication request for the hardware-trusted data communication, control VNF 111 in NFVI server 121 and hardware trust server 130 exchange session data to verify hardware trust for the individual network bearer based on current hardware trust of the data VNFs used for the network bearer. In this specific example, the network bearer uses data VNFs 113, 116, and 119 in NFVI servers 121-122 and 129. The network bearer does not use VNFs 111-112, 114-115, and 117-118 or NFVI servers 123-128. Thus, the current hardware trust status of data VNFs 113, 116, and 119 in NFVI servers 121-122 and 129 is verified by hardware trust server 130 before approving the network bearer for use.

In the above example where hardware trust server 140 performs hardware trust validations for particular VNF/NFVI pairs during VNF on-boarding, hardware trust server 140 may also update a VNF hardware-trust authorization database for the individual VNF/NFVI pairs responsive the VNF on-boarding/off-boarding processes.

Although this example implements hardware trust at the server level, hardware trust for the individual network bearers may be implemented with greater resolution by maintaining and verifying hardware trust for the individual bearers at the Central Processing Unit (CPU) level, CPU core level, or some other circuitry layer. In addition, hardware such as memory devices and Input/Output (I/O) ports may also be associated with the individual network bearers in a like manner to have their hardware trust verified before the data exchange. For example, the memory controllers in the memories that store user data for trusted VNFs may have to perform hardware trust verifications before use.

In addition to NFVI servers 121-129, the data path may utilize data machines, wireless relays, and other devices. The data path also traverses user communication device 101. Hardware trust for the network bearer may also include the maintenance and verification of hardware trust with user communication device 101, wireless relays, data machines, and/or other devices before they perform a hardware-trusted data exchange.

Figure 2:
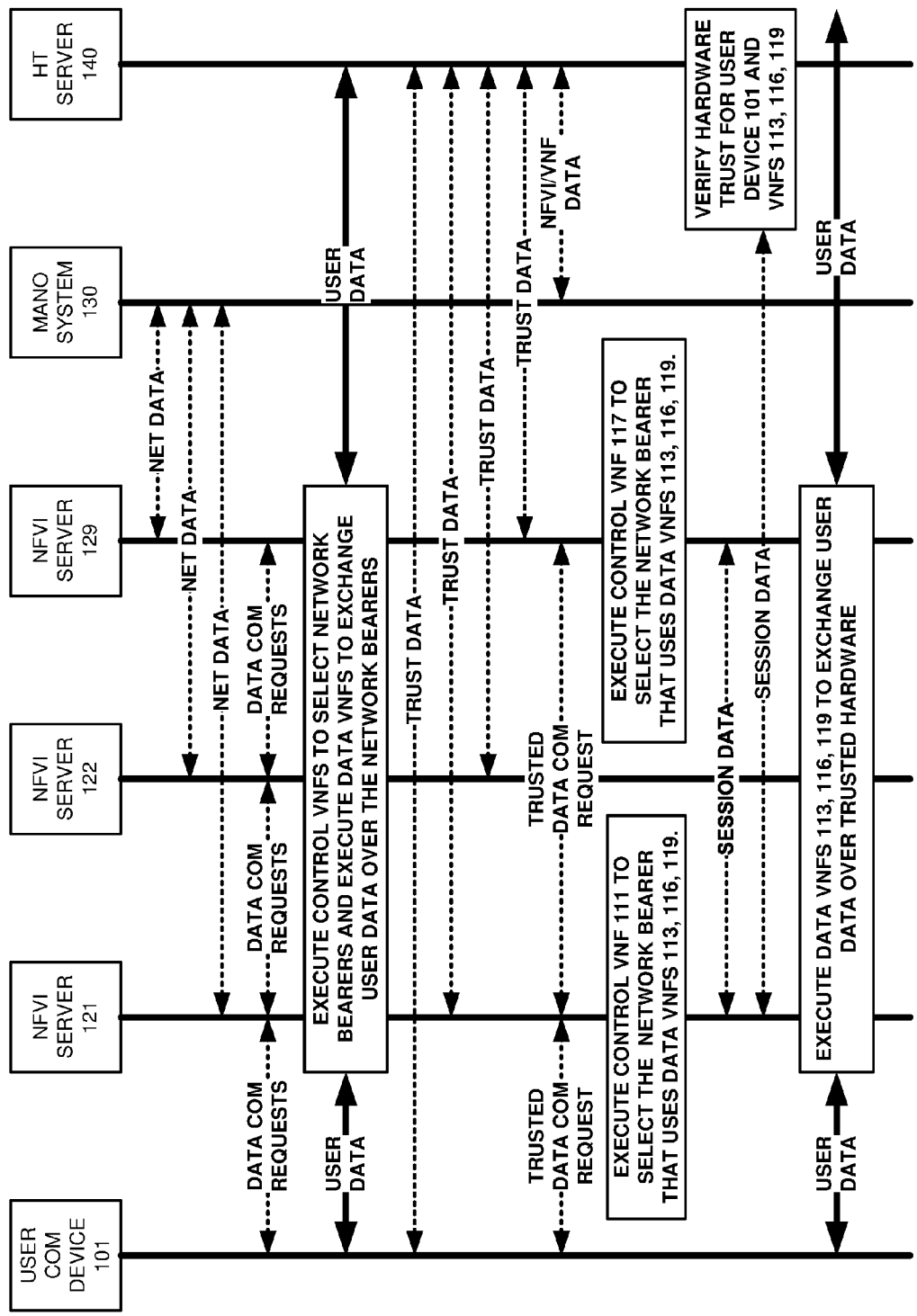
FIG. 2 illustrates the operation of a data communication network to exchange user data over hardware-trusted network bearers.

FIG. 2 illustrates the operation of data communication network 100 to exchange user data over hardware-trusted network bearers. Initially, NFVI servers 121-129 and MANO system 130 exchange networking data, and in response, NFVI servers 121-129 execute VNFs 111-119. A control set of VNFs 111-119 process data communication requests to select network bearers. A data set of VNFs 111-119 exchange user data over the selected network bearers. Hardware trust verification of these network bearers was not performed.

To implement hardware trust verification of a network bearer, Hardware Trust (HT) server 140 and user communication device 101 exchange trust data, and in response, HT server 134 maintains hardware trust in hardware-trusted user communication device 101. HT server 140 and the hardware-trusted set of NFVI servers 121-122 and 129 exchange trust data, and in response, HT server 130 maintains hardware trust in the set of hardware-trusted NFVI servers 121-122 and 129. HT server 140 and MANO system 130 exchange NFVI/VNF data, and in response, HT server 140 associates a hardware-trusted set of data VNFs 113, 116, and 119 with the hardware-trusted set of NFVI servers 121-122 and 129. In some examples, HT server 140 performs the hardware-trust validations for NFVI/VNF pairs in response to MANO data indicating that the VNF is on-boarding to an NFVI server, blade, CPU, or core.

In NFVI servers 121 and 129, control VNFs 111 and 117 process a data communication request for a hardware trusted data communication to select a network bearer that is supported by a set of data VNFs 113, 116, and 119. The control VNFs 111 and 117 then exchange session data with one another and HT server 140 to verify hardware trust in data VNFs 113, 116, and 119—the selected network bearer. In this example, the data VNFs 113, 116, 119 are in the set of hardware-trusted VNFs, so HT server 140 approves the hardware-trusted data communication over the selected network bearer. Control VNFs 111 and 117 then direct hardware-trusted data VNFs 113, 116, and 119 to exchange user data over a network bearer that uses trusted hardware.

In data communication network 100, user communication device 101 comprises a computer, machine transceiver, or some other data apparatus. NFVI servers 121-129, MANO system 130, and hardware trust server 140 comprise computer systems with data processing circuitry, data memory, operating software, and data communication interfaces. The data links that couple user communication device 101 and NFVI servers 121-129 use media such as air, metal, and/or glass, and may include intermediate data devices, systems, and networks. The data links use protocols like Long Term Evolution (LTE), Wireless Fidelity (WiFi), Ethernet, Wave Division Multiplexing (WDM), Ethernet, Data over Cable System Interface Specification (DOCSIS), Internet Protocol (IP), and/or some other data communication format—including combinations thereof.

Figure 3:
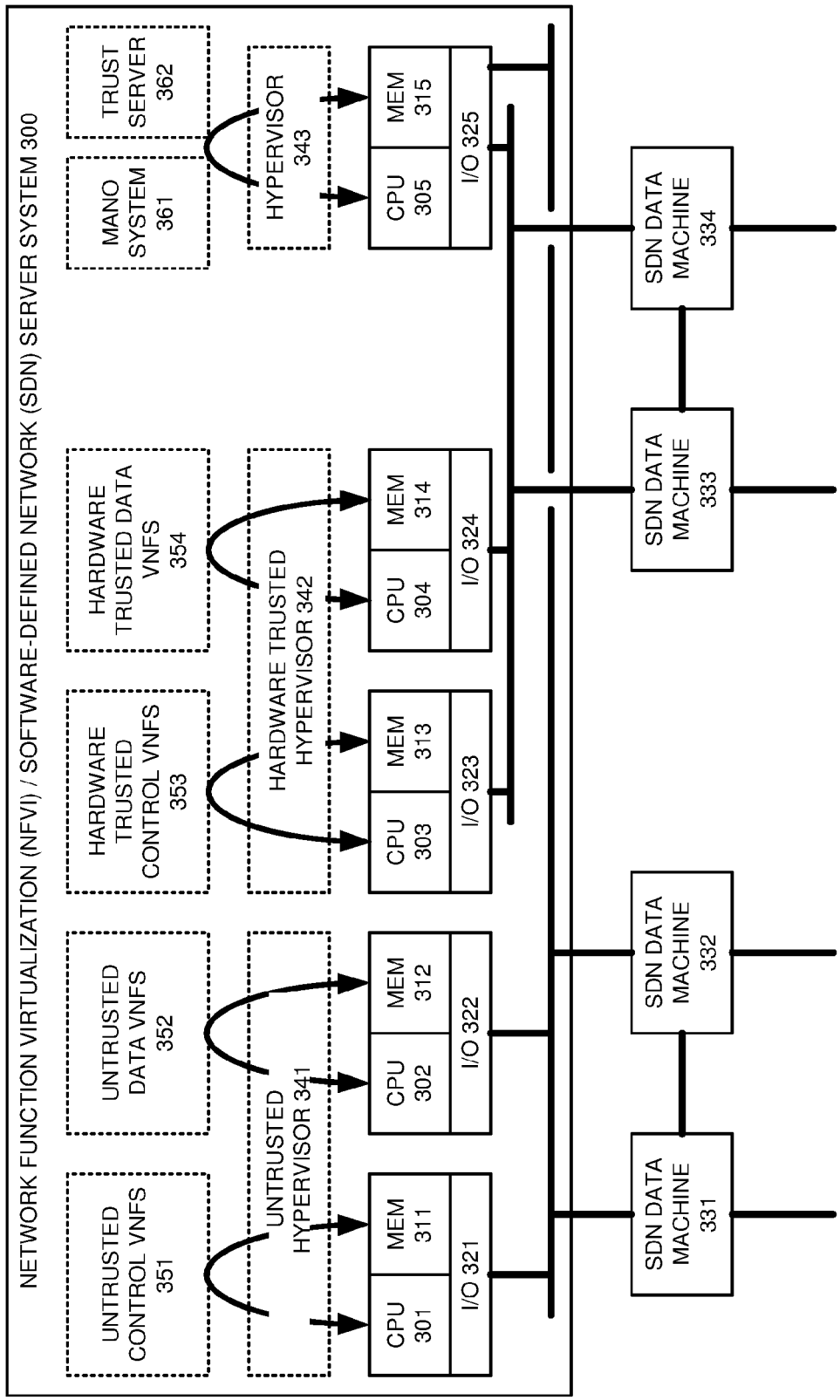
FIG. 3 illustrates a Network Function Virtualization Infrastructure (NFVI) and Software-Defined Network (SDN) server system to exchange user data over hardware-trusted network bearers.

FIG. 3 illustrates Network Function Virtualization Infrastructure (NFVI)/Software-Defined Network (SDN) server system 300 to exchange user data over hardware-trusted network bearers. NFVI/SDN server system 300 is an example of data communication network 100, although network 100 may use alternative configurations and operations. NFVI/SDN server system 300 comprises CPUs 301-305, memories 311-315, and I/O ports 321-325. I/O ports 321-325 are coupled to SDN data machines 331-334. The number of CPUs, memory, I/O and software components has been restricted for clarity.

NFVI/SDN server system 300 includes hypervisors 341-343. Untrusted control and data VNFs 351-352 (and their data) traverse between CPUs 301-302 and memories 311-312 under the control of hypervisor 341. Hardware-trusted control and data VNFs 353-354 (and their data) traverse between CPUs 303-304 and memories 313-314 under the control of hypervisor 342. Software and data for MANO system 361 and hardware trust server 362 traverse between CPU 305 and memory 315 under the control of hypervisor 343. MANO system 361 directs hypervisors 341-342 to retrieve VNFs 351-354 from memories 311-314 and to execute VNFs 351-354 on the appropriate CPUs 301-304. MANO 361 directs hypervisors 341-342 to control which memories 311-314 and I/O ports 321-325 are used by VNFs 351-354 and their data.

Hardware trust server 362 exchanges trust data with SDN data machines 333-334, CPUs 303-304, memories 313-314, and I/O ports 323-324 during trust validation time cycles to maintain hardware trust. CPU 305/server 362 issues random numbers to trust controllers in the various trusted hardware elements (303-304, 313-314, 323-324, 333-334). The trust controllers in these hardware elements hash the random numbers with their individual physically-embedded trust codes to generate and respond with their individual trust results. CPU 305/server 362 verifies hardware trust by hashing the same random numbers and trust codes from memory 315 to generate matching trust results.

MANO system 361 transfers VNF execution data to hardware trust sever 362 indicating the actual NFVI/VNF execution history. The NFVI/VNF execution history specifies CPU/VNF pairs, on/off-boarding times, execution times, and other VNF/NFVI usage metrics such as the hypervisor, virtual container, MANO system, memory device, I/O port, and SDN machine used by the VNF during execution. Hardware trust server 362 then associates hardware trust with VNFs 353-354 based on a time correlation of the VNF execution times and the hardware validation times.

Consider a scenario where one of control VNFs 353 is a master VNF that receives a communication request from a user communication device for a hardware-trusted communication session. In response to the communication request, master VNF 353 interacts with other control VNFs 353 to select network bearers for the hardware-trusted communication session. Master VNF 353 and hardware trust server 362 exchange session data that indicates the specific data VNFs 352 and 354 and SDN data machines 331-334 that support the selected network bearers. If an error has occurred, then untrusted data VNFs 352 or data machines 331-332 are indicated.

To verify hardware trust for the network bearer, hardware trust server 362 verifies if the data VNFs and SDN data machines that support the network bearers are in the set of hardware trusted data VNFs and data machines. In a positive example, only hardware-trusted data VNFs 354 and SDN data machines 333-334 are indicated for the network bearers, and they are in the set of hardware-trusted data VNFs and SDN data machines. In a negative example, data VNFs 352 or SDN data machines 331-332 may be indicated for the network bearers, and they are not in the set of hardware-trusted data VNFs and data machines. If hardware trust validation of the network bearers is successful, then master VNF 353—typically with the help of other control VNFs 353—would direct data VNFs 354 and SDN data machines 333-334 to exchange the user data over the selected network bearers.

Figure 4:
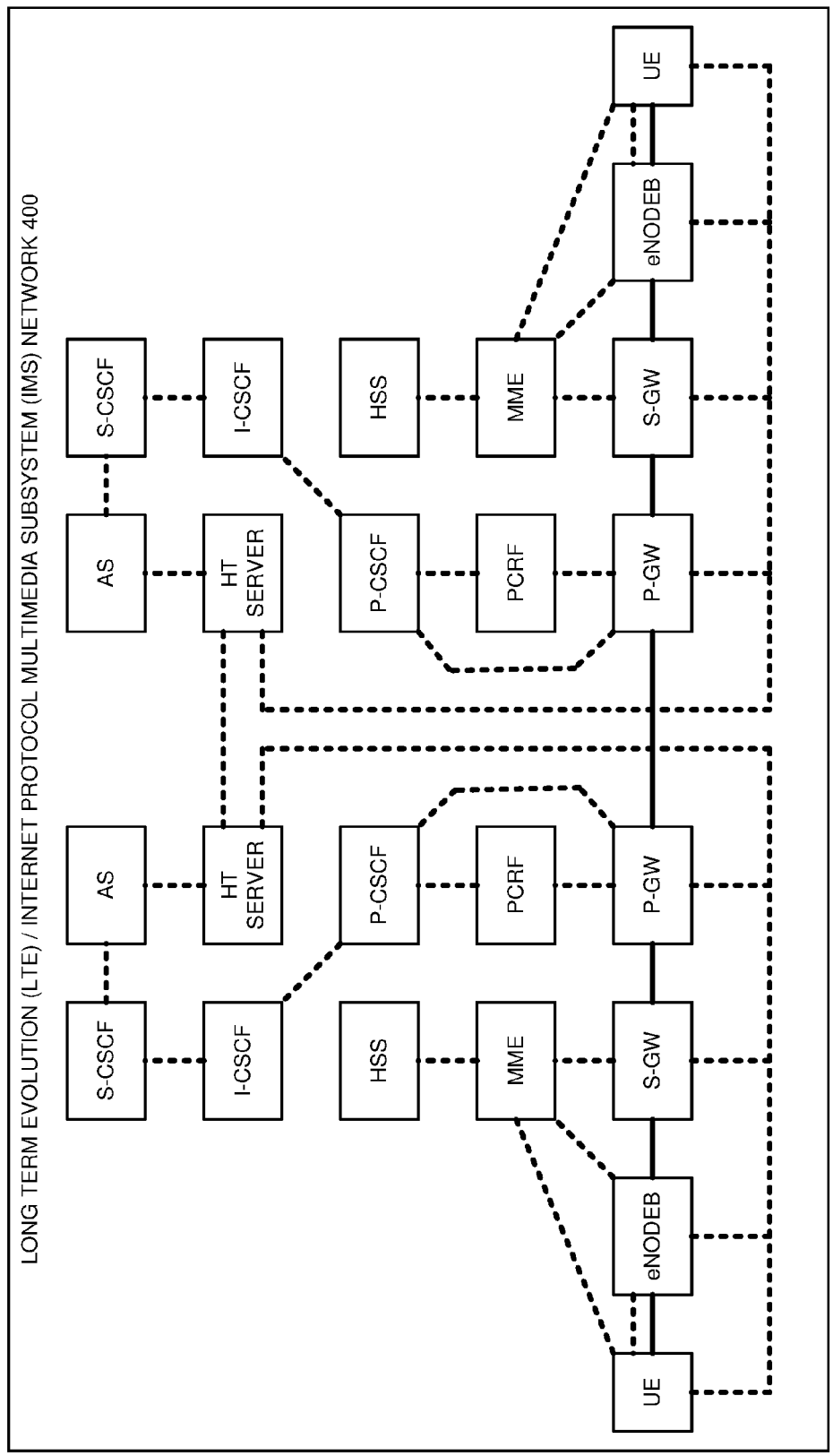
FIG. 4 illustrates a Long Term Evolution (LTE) and Internet Protocol Multimedia Subsystem (IMS) to exchange user data over hardware-trusted network bearers.

FIG. 4 illustrates Long Term Evolution (LTE)/Internet Protocol Multimedia Subsystem (IMS) 400 to exchange user data over hardware-trusted network bearers. LTE/IMS 400 is an example of data communication network 100, although network 100 may use alternative configurations and operations. LTE/IMS network 400 comprises various LTE and IMS network elements: User Equipment (UE), eNodeB, Serving Gateway (S-GW), Mobility Management Entity (MME), Packet Data Network Gateway (P-GW), Policy Charging Rules Function (PCRF), Home Subscriber System (HSS), Proxy Call State Control Function (P-CSCF), Interrogating CSCF (I-CSCF), Service CSCF (S-CSCF), Application Server (AS), and Hardware Trust (HT) server.

Many of these network elements share hardware systems. Many of these network elements further comprise VNFs or VNF Components (VNFCs). For example, a first VNF complex of S-GW, MME, HSS, P-GW, and PCRF may share a server blade on a common backplane with a second VNF complex of P-CSCF, I-CSCF, S-CSCF, AS, and HT server. In another example, an eNodeB base station may execute its baseband VNFCs on an NFVI server that is shared with other eNodeBs.

Many of the network elements execute VNFs to exchange user data between the UEs. The HT servers exchange trust data with one another and with the LTE data plane: UE, eNodeB, S-GW, and P-GW to maintain hardware trust. The HT servers may issue random numbers to the data plane elements which then hash the random numbers with their individual physically-embedded trust codes to generate and respond with their trust results. The HT servers verify hardware trust by separately hashing the random numbers and their own version of the trust codes to generate matching trust results.

The network MANO system (not shown) transfers VNF execution data for the network elements to the HT servers indicating the VNF execution history. The execution history associates various hardware elements with various network element VNFs and their corresponding usage times. The HT servers associate hardware trust with the network element VNFs based on a time correlation of their execution times and the hardware validation times for their associated hardware elements. Thus, the trust validation times of the eNodeB, S-GW, P-GW hardware elements are time correlated to the VNF execution times of these network elements. The resulting data specifies a set of hardware-trusted network elements.

To set-up a hardware-trusted data session, a UE transfers a communication request that indicates the need for a hardware-trusted network bearer. The request could be Radio Resource Control (RRC) data to an eNodeB or Non-Access Stratum (NAS) data to an MME. In response to the communication request, an HSS selects an Application Point Name (APN) that supports hardware-trusted network bearers, and the MME selects an S-GW and a P-GW for the hardware trusted APN. The selected P-GW transfers the APN to the PCRF to select a Quality of Service Class Identifier (QCI) for the hardware-trusted network bearer between the UE and the P-GW over the eNodeB and the S-GW. The P-GW transfers the session information to the MME though the S-GW.

Responsive to the trusted-hardware requirement, the MME and an HT server exchange session data to verify hardware trust for the network elements that support the network bearer—the UE, eNodeB, S-GW, and P-GW. In some cases, the network elements are trusted at the device level, but for other elements like a virtualized S-GW and P-GW, the virtualized network elements are hardware-trusted at the paired VNF/NFVI server level. To verify hardware trust for the network bearer, the HT server verifies that the indicated network elements are in the set of hardware-trusted network elements that was defined at the VNF level or even the VNFC level. The MME allows the exchange of user data over the selected network bearers if the HT server reports that hardware trust validation is successful. The MME disallows the exchange of user data over the selected network bearers if the HT server reports that hardware trust validation is not successful.

To set-up a hardware-trusted media session, a UE again transfers a communication request that indicates the need for a hardware-trusted data path. This request could be a Session Initiation Protocol (SIP) Invite or some other peering request to a P-CSCF. In response to the communication request, the P-CSCF interacts with the I-CSCF, S-CSCF, and AS to identify the LTE system serving the UE.

Responsive to the trusted-hardware requirement, the AS, HT server, and MME exchange session data to verify hardware trust for a network bearer through the LTE system. To verify hardware trust for the network bearer, the HT server verifies that data VNFs for the indicated network bearer are in the set of hardware-trusted VNFs. The AS allows the exchange of user data over the selected network bearer if the HT server reports that hardware trust validation is successful. The AS disallows the exchange of user data over the selected network bearer if the HT server reports that hardware trust validation is not successful.

Figure 5:
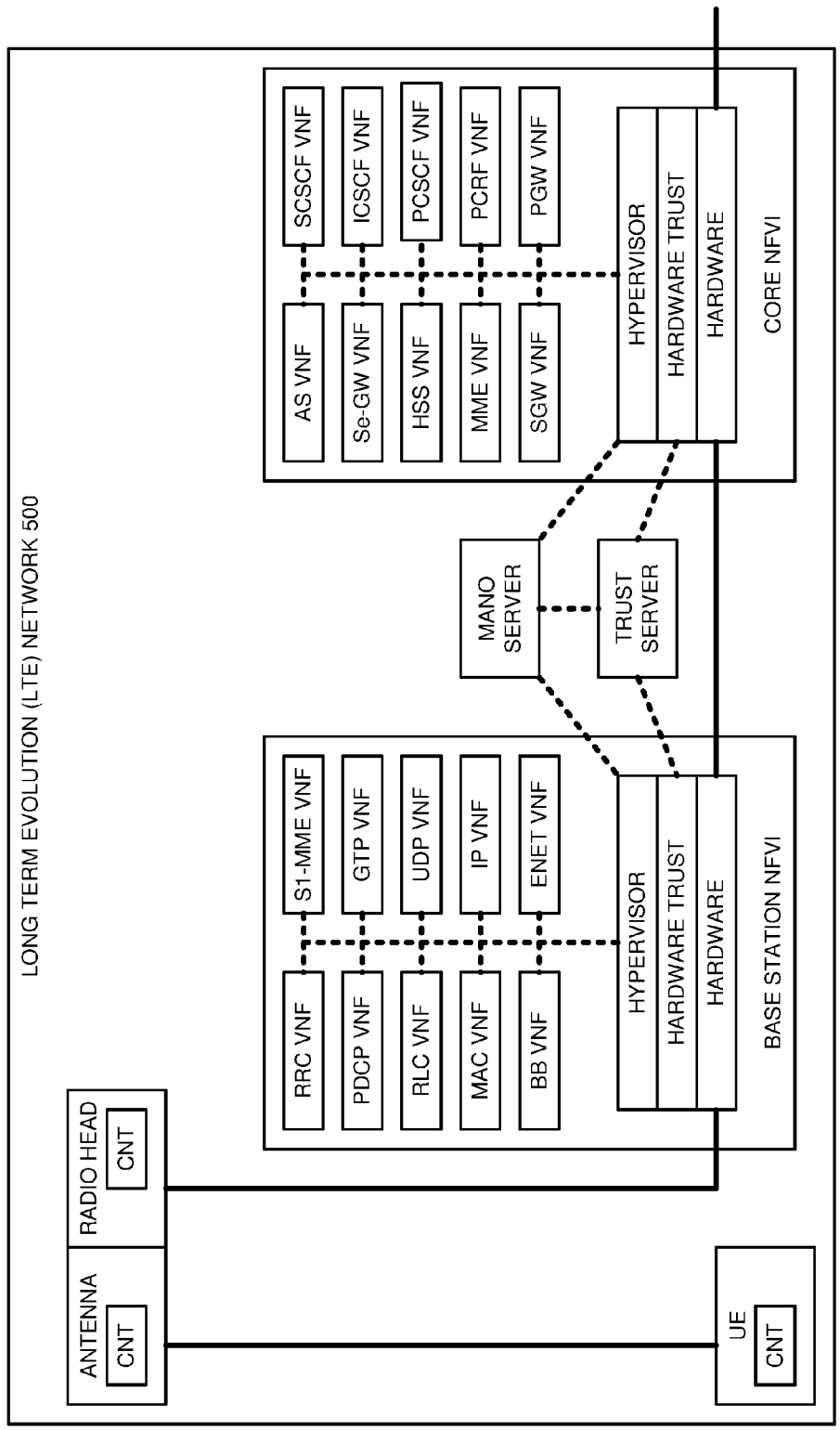
FIG. 5 illustrates a Long Term Evolution (LTE) network to exchange user data over hardware-trusted network bearers.

FIG. 5 illustrates Long Term Evolution (LTE) network 500 to exchange user data over hardware-trusted network bearers. LTE network 500 is an example of data communication network 100, although network 100 may use alternative configurations and operations. LTE network 500 comprises: User Equipment (UE), antenna, radio head, base station NFVI, core NFVI, trust server, and a Management and Orchestration (MANO) server. The UE, antenna, and radio head have hardware-trust controllers (CNT) that interact with the trust server to maintain hardware trust.

The base station NFVI and the core NFVI comprise hardware like CPU cores, data memories, and I/O transceivers. The hardware initially executes hardware-trust software to interact with the hardware trust server and maintain hardware trust for the CPU cores, data memories, and I/O transceivers. After hardware trust configuration, the base station and core NFVIs execute hypervisor software to provide a virtualized processing environment. Under the control of the MANO server, the hypervisors execute various VNFs to exchange user data.

In the base station NFVI, the hypervisor executes the following VNFs: Baseband (BB), Media Access Control (MAC), Radio Link Control (RLC), Packet Data Convergence Protocol (PDCP), Radio Resource Control (RRC), Ethernet, IP, User Data Protocol (UDP), General Packet Radio Service Transfer Protocol (GTP), and S1-MME signaling. In the core NFVI, the hypervisor executes the following VNFs: Serving Gateway (S-GW), Mobility Management Entity (MME), Home Subscriber System (HSS), Secure Gateway (Se-GW), Application Server (AS), Packet Data Network Gateway (P-GW), Policy Charging Rules Function (PCRF), Proxy Call State Control Function (P-CSCF), Interrogating CSCF (I-CSCF), and Service CSCF (S-CSCF).

The trust server exchanges trust data with the trust controllers in the UE, antenna, and radio head to maintain hardware trust at the device-level. The trust server exchanges trust data with the base station NFVI and the core NFVI to maintain hardware trust at the CPU core, memory device, and I/O transceiver level.

The MANO server transfers networking data to the base station NFVI to drive the execution of the base station VNFs. The MANO server transfers networking data to the core NFVI to drive the execution of the core VNFs. The MANO server transfers the VNF execution history to the trust server. The execution history associates individual VNFs with their CPU cores, memory devices, I/O transceivers, and boarding/execution times. The trust server associates hardware trust with the base station VNFs and the core VNFs based on a time correlation of their execution times and the hardware validation times for their associated hardware elements. For example, the trust validation times of a base station CPU core can be time correlated to the execution times for the RRC VNF on that CPU core. The trust server maintains a database of hardware trusted VNFs that may be indexed by network, network element, VNF, VNFC, CPU core, memory device, and I/O transceiver.

To set-up a hardware-trusted data session, the UE transfers a communication request to the RRC VNF and the MME VNF that indicates the need for a hardware-trusted network bearer. The request comprises a Radio Resource Control (RRC) data element coupled with a Non-Access Stratum (NAS) instruction. The RRC VNF recognizes the request and informs the MME VNF through the S1-MME VNF. In response, the MME VNF uses the HSS VNF to select an Application Point Name (APN) that supports a hardware-trusted network bearer. The MME VNF selects an S-GW VNF and a P-GW VNF for the hardware trusted APN. The selected P-GW VNF transfers the hardware-trusted APN to the PCRF VNF to select a QCI for the hardware-trusted network bearer between the UE and the P-GW. The network bearer traverses the UE, antenna, radio head, base station NFVI (BB VNF, MAC VNF, RLC, VNF, PDCP VNF, RRC VNF, GTP VNF, IP VNF, Ethernet VNF) and core NFVI (S-GW VNF and P-GW VNF). The P-GW VNF transfers the session information to the MME VNF though the S-GW VNF.

Responsive to the trusted-hardware requirement in the NAS and S1-MME data, the MME VNF and the trust server exchange session data to verify hardware trust for the network bearer—the UE, antenna, radio head, and the NFVI hardware for the data VNFs. To verify hardware trust for the network bearer, the trust server verifies that the indicated UE, antenna, and radio head are in the set of hardware-trusted network elements. To verify hardware trust for the network bearer, the trust server also verifies that the indicated VNFs or VNFCs and their paired CPU cores, data memories, and I/O transceivers are in the set of hardware-trusted VNF/core, VNF/memory, and VNF/transceiver pairings. The MME allows the exchange of user data over the selected network bearer if the trust server reports that hardware trust validation is successful. The MME disallows the exchange of user data over the selected network bearer if the trust server reports that hardware trust validation is not successful.

To set-up a hardware-trusted media session, the UE transfers a Session Initiation Protocol (SIP) Invite to the P-CSCF VNF. In response to the SIP invite, the P-CSCF interacts with the I-CSCF, S-CSCF, and AS to identify the LTE system serving the UE. Responsive to the trusted-hardware requirement, the AS VNF, MME VNF, and the trust server exchange session data to verify hardware trust for the network bearer through the LTE system. To verify hardware trust for the network bearer, the trust server verifies that the UE, antenna, radio head, and data VNF/NFVI hardware pairs for the network bearer are in the set of hardware-trusted UEs, antennas, radio heads, and data VNF/NFVI hardware pairs. The AS allows the exchange of user data over the selected network bearer if the trust server reports that hardware trust validation is successful. The AS disallows the exchange of user data over the selected network bearer if the trust server reports that hardware trust validation is not successful.

Figure 6:
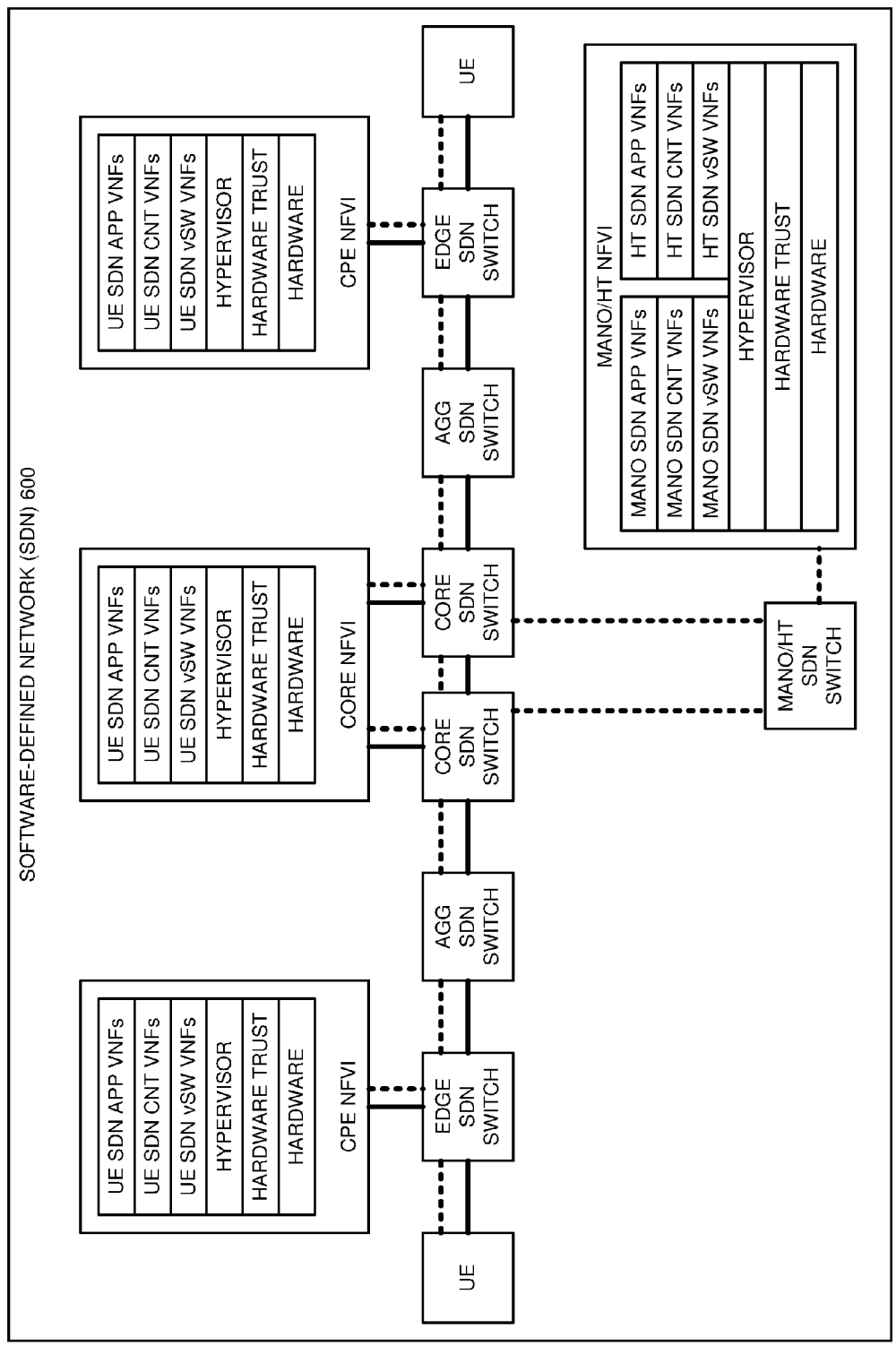
FIG. 6 illustrates a Software-Defined Network (SDN) to exchange user data over hardware-trusted network bearers.

FIG. 6 illustrates Software-Defined Network (SDN) 600 to exchange user data over hardware-trusted network bearers. SDN 600 is an example of data communication network 100, although network 100 may use alternative configurations and operations. SDN 600 comprises: User Equipment (UE), edge SDN switches, aggregation (AGG) SDN switches, core SDN switches, a MANO/HT SDN switch, CPE NFVIs, a core NFVI, and a MANO/HT NFVI. The NFVIs comprise hardware such as CPU cores, flash memories, and I/O transceivers.

The UEs and SDN switches maintain hardware trust with an HT system in the MANO/HT NFVI. The NFVIs use hardware trust software to maintain hardware trust for their CPU cores, flash memories, and I/O transceivers with the HT system in the MANO/HT NFVI. After hardware trust configuration, the NFVIs execute hypervisor software to provide a virtualized processing environment. Under the control of a MANO system, the hypervisors execute various SDN VNFs. In the CPE and core NFVIs, the hypervisors execute UE SDN virtual switch (vSW) VNFs, UE SDN controller (CNT) VNFs, and UE SDN application (APP) VNFs. In the MANO/HT NFVI, the hypervisor executes MANO SDN vSW VNFs, MANO SDN CNT VNFs, MANO SDN APP VNFs, HT SDN vSW VNFs, HT SDN CNT VNFs, and HT SDN APP VNFs.

The MANO VNFs transfer networking data to the core NFVI hypervisors and the CPE NFVI hypervisors to drive the execution of the UE SDN VNFs. The MANO VNFs transfer VNF execution history to the HT VNFs. The execution history associates individual VNFs with their CPU cores, memory devices, I/O transceivers, and boarding/execution times. The trust server associates hardware trust with the UE SDN VNFs based on a time correlation of their execution times and the hardware validation times for their associated hardware elements. For example, the trust validation times of a CPE NFVI CPU core can be time correlated to the execution times for a UE SDN vSW VNF on that CPU core. The HT VNFs maintain a database of hardware trusted UE SDN VNFs, UEs, and SDN switches.

To set-up a hardware-trusted data session between the UEs, one of the UEs transfers a communication request to a UE SDN APP VNF that indicates the need for a hardware-trusted network bearer. The UE SDN APP VNF detects the request and informs the SDN CNT VNF to use only hardware-trusted SDN switches and hardware-trusted vSW VNF/NFVI pairs. The UE SDN APP VNF in the CPE NFVI informs the UE SDN APP VNF in the core to use only hardware-trusted SDN switches and vSW VNF/NFVI pairs on the session. In the core NFVI, the UE SDN APP VNF informs the SDN CNT VNF to use only hardware-trusted SDN switches and vSW VNF/NFVI pairs on the session. The UE SDN APP VNF in the core NFVI informs the UE SDN APP VNF in the other CPE NFVI to use only hardware-trusted SDN switches and vSW VNF/NFVI pairs on the session. In the other CPE NFVI, the UE SDN APP VNF informs the UE SDN CNT VNF to use only hardware-trusted SDN switches and vSW VNF/NFVI pairs on the session. The UE SDN CNT VNFs return session data to the UE SDN APP VNFs indicating the UEs, SDN switches, and UE SDN VNF/NFVI pairs for the network bearer.

Responsive to the hardware trust requirement, the master UE SDN APP VNF and the trust server exchange session data to verify hardware trust for the network bearer—the UEs, SDN switches, and the UE SDN VNF/NFVI hardware pairs. To verify hardware trust for the network bearer, the HT SDN APP VNFs verify that the indicated UEs, SDN switches, and UE SDN VNF/NFVI hardware pairs are in the set of hardware-trusted UEs, SDN switches, and UE SDN VNF/NFVI hardware pairs. The UE SDN APP VNF allows the exchange of user data over the selected network bearer if the trust server reports that hardware trust validation is successful. The UE SDN APP VNF disallows the exchange of user data over the selected network bearer if the trust server reports that hardware trust validation is not successful.

Figure 7:
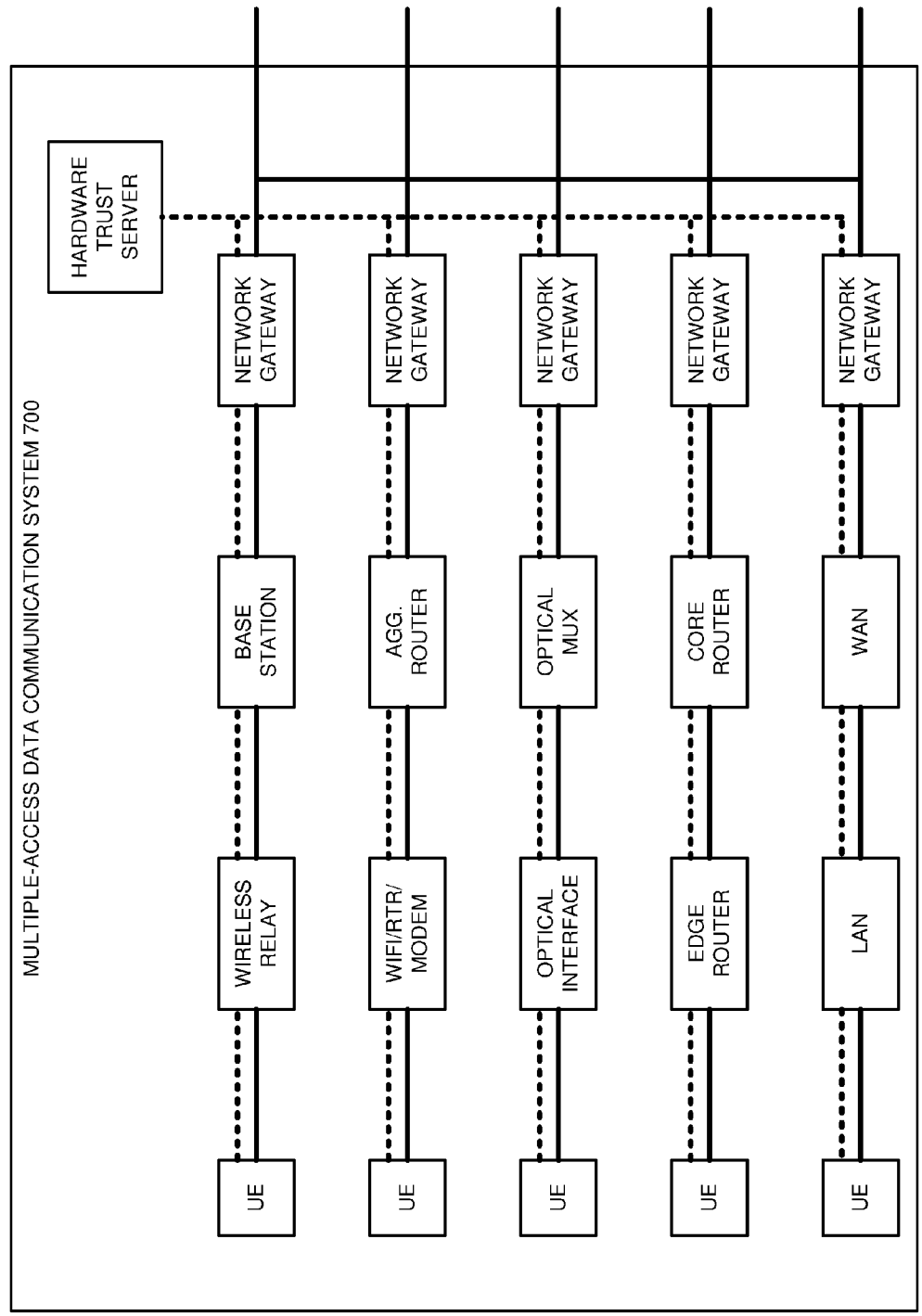
FIG. 7 illustrates a multiple-access data communication system to exchange user data over hardware-trusted network bearers.

FIG. 7 illustrates multiple-access data communication system 700 to exchange user data over hardware-trusted network bearers. Multiple-access data communication system 700 is an example of data communication network 100, although network 100 may use alternative configurations and operations. In multiple-access data communication system 700, a set of network gateways are coupled together, and UEs are coupled to these network gateways over various network elements. The network elements include: wireless relays and base stations, wifi/router/modems and aggregation routers, optical interfaces and multiplexers (MUX), edge and core routers, and Local Area Network/Wide Area Network (LAN/WAN) combinations.

Some of the network elements use VNFs and MANO systems and some do not. In this illustrative example, the top three UEs do not use VNF/MANO technology while the lower two UEs are implemented in CPE NFVI MANO systems. The wireless relay, wifi/router/modem, optical interface, and optical mux do not use VNF/MANO technology while the edge router, LAN, base station, aggregation router core router, WAN, and the network gateways are implemented in network NFVI MANO systems.

The hardware trust server exchanges trust data with the network elements to maintain hardware trust and to approve hardware-trusted network bearers. For non-NFV network elements, the hardware trust server exchanges trust data to maintain hardware trust at the device level. For the NFVI network elements, the hardware trust server exchanges trust data to maintain hardware trust at the sub-device level (CPU core, memory device, I/O transceiver).

For the NFVI network elements, the hardware trust server exchanges VNF execution data to dynamically associate executing VNFs with their current NFVI hardware trust status. For example, the database indicates that a base station VNF is hardware-trusted if the base station NFVI CPU cores, VNF memories, and VNF I/O that currently support the VNF have contemporaneously passed hardware trust validation. The database may indicate that a VNF is not hardware-trusted if a current CPU core, memory, or I/O used by the VNF have failed a contemporaneous hardware trust validation.

The VNFs include master VNFs that detect requests for hardware-trusted bearers. The requests might be indicated through signaling data, IP address, IP port, MPLS label or some other data indicator. The hardware trust server maintains contact with the UEs and their master VNFs to ensure that access to hardware-trusted network bearers is active between the UEs and their master VNFs. Exemplary master VNFs include MMEs, PCRFs, AS, edge/aggregation routers, base stations, and LANs.

The master VNFs detect requests for hardware-trusted bearers and interact with other control VNFs to select hardware trusted network bearers in the form of data devices and data VNFs. For example, a network bearer may comprise a UE, a wireless relay, a base station, two network gateways, an optical mux, an optical interface, and another UE. The base station and the two network gateways use a set of data VNFs for the network bearer. The master VNFs interact with the hardware trust server to approve the hardware-trusted network bearers by device and by VNF/hardware element pair. In the present example, the UEs, wireless relay, optical mux, and optical interface require contemporaneous hardware trust verification at the device level. The base station and network gateways require contemporaneous hardware trust verification at the VNF/core, VNF/memory, and VNF/transceiver levels.

Data communication system 700 exchanges user data over the selected network bearer if the hardware trust server reports to the master VNF that hardware trust validation for the network bearer is successful. Data communication system 700 does not exchange user data over the selected network bearer if the hardware trust server reports to the master VNF that hardware trust validation is not successful for that bearer.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication network having Network Function Virtualization Infrastructure (NFVI) servers, the method comprising:
   the NFVI servers and a Management and Orchestration (MANO) system exchanging networking data, and in response, the NFVI servers executing Virtual Network Functions (VNFs) to exchange user data;
   a Hardware Trust (HT) server and a hardware-trusted set of the NFVI servers exchanging trust data, and in response, the HT server maintaining hardware trust in the hardware-trusted set of the NFVI servers;
   the HT server and the MANO system exchanging NFVI/VNF execution data, and in response, the HT server associating a hardware-trusted set of the VNFs with the hardware-trusted set of the NFVI servers;
   a control set of the VNFs receiving a communication request for a hardware-trusted data communication and responsively selecting a network bearer that is supported by a data set of the VNFs and indicating the data set of the VNFs to the HT server;
   the HT server determining if the data set of the VNFs is in the hardware-trusted set of the VNFs, and if the data set of the VNFs is in the hardware-trusted set of the VNFs, then indicating to the control set of the VNFs that the hardware-trusted data communication may proceed; and
   the control set of the VNFs directing the data set of the VNFs to proceed with the hardware-trusted data communication responsive to the indication from the HT server, and the data set of the VNFs transferring the hardware-trusted data communication over the selected network bearer.

2. The method of claim 1 wherein:
   receiving the communication request for the hardware-trusted communication session comprises receiving a Radio Resource Control (RRC) hardware-trust indicator from a user communication device; and
   selecting the network bearer for the hardware-trusted communication session comprises identifying an Access Point Name (APN).

3. The method of claim 1 wherein:
   receiving the communication request for the hardware-trusted communication session comprises receiving a Non-Access Stratum (NAS) hardware-trust indicator from a user communication device; and
   selecting the network bearer for the hardware-trusted communication session comprises identifying an Access Point Name (APN).

4. The method of claim 1 wherein:
   receiving the communication request for the hardware-trusted communication session comprises receiving a Session Initiation Protocol (SIP) hardware-trust indicator from a user communication device; and
   selecting the network bearer for the hardware-trusted communication session comprises identifying an Access Point Name (APN).

5. The method of claim 1 further comprising:
   the HT server and a hardware-trusted set of Software Defined Network (SDN) data machines exchanging additional trust data, and in response, the HT server maintaining hardware trust in the hardware-trusted set of the SDN data machines;
   wherein the selected network bearer is supported by a data set of the SDN data machines and further comprising the control set of the VNFs indicating the data set of the SDN data machines to the HT server;
   the HT server determining if the data set of the SDN data machines is in the hardware-trusted set of the SDN data machines, and wherein indicating to the control set of the VNFs that the hardware-trusted data communication may proceed comprises indicating that the communication may proceed if both the data set of the VNFs is in the hardware-trusted set of the VNFs and if the data set of the SDN data machines is in the hardware-trusted set of the SDN data machines.

6. The method of claim 1 further comprising:
   the HT server and a hardware-trusted set of wireless relays exchanging additional trust data, and in response, the HT server maintaining hardware trust in the hardware-trusted set of the wireless relays;
   wherein the selected network bearer is supported by a data set of the wireless relays and further comprising the control set of the VNFs indicating the data set of the wireless relays to the HT server;

the HT server determining if the data set of the wireless relays is in the hardware-trusted set of the wireless relays, and wherein indicating to the control set of the VNFs that the hardware-trusted data communication may proceed comprises indicating that the communication may proceed if both the data set of the VNFs is in the hardware-trusted set of the VNFs and if the data set of the wireless relays is in the hardware-trusted set of the wireless relays.

7. The method of claim 1 further comprising:
the HT server and a hardware-trusted set of User Equipment (UEs) exchanging additional trust data, and in response, the HT server maintaining hardware trust in the hardware-trusted set of the UEs;

wherein the selected network bearer is supported by a data set of the UEs and further comprising the control set of the VNFs indicating the data set of the UEs to the HT server;

the HT server determining if the data set of the UEs is in the hardware-trusted set of the UEs, and wherein indicating to the control set of the VNFs that the hardware-trusted data communication may proceed comprises indicating that the communication may proceed if both the data set of the VNFs is in the hardware-trusted set of the VNFs and if the data set of the UEs is in the hardware-trusted set of the UEs.

8. The method of claim 1 wherein the VNFs comprise Long Term Evolution (LTE) VNFs.

9. The method of claim 1 wherein the VNFs comprise Internet Protocol Multimedia Subsystem (IMS) VNFs.

10. The method of claim 1 wherein the VNFs comprise Software Defined Network (SDN) VNFs.

11. A data communication network that uses trusted hardware comprising:
Network Function Virtualization Infrastructure (NFVI) servers having NFVI processing circuitry and memory configured to exchange networking data with a Management and Orchestration (MANO) system, and in response, to execute Virtual Network Functions (VNFs) to exchange user data;

a Hardware Trust (HT) server having HT processing circuitry and memory configured to exchange trust data with a hardware-trusted set of the NFVI servers, and in response, to maintain hardware trust in the hardware-trusted set of the NFVI servers;

the HT processing circuitry and memory in the HT server configured to exchange NFVI/VNF execution data with the MANO system, and in response, to associate a hardware-trusted set of the VNFs with the hardware-trusted set of the NFVI servers;

a control set of the VNFs executing on the NFVI processing circuitry and memory in the NFVI servers and configured to receive a communication request for a hardware-trusted data communication and responsively select a network bearer that is supported by a data set of the VNFs and indicate the data set of the VNFs to the HT server;

the HT processing circuitry and memory in the HT server configured to determine if the data set of the VNFs is in the hardware-trusted set of the VNFs, and if the data set of the VNFs is in the hardware-trusted set of the VNFs, then to indicate to the control set of the VNFs that the hardware-trusted data communication may proceed; and the control set of the VNFs executing on the NFVI processing circuitry and memory in the NFVI servers and configured to direct the data set of the VNFs to proceed with the hardware-trusted data communication responsive to the indication from the HT server, and the data set of the VNFs executing on the NFVI processing circuitry and memory in the NFVI servers configured to transfer the hardware-trusted data communication over the selected network bearer.

12. The data communication network of claim 11 wherein:
the control set of the VNFs executing on the NFVI processing circuitry and memory in the NFVI servers are configured to receive the communication request for the hardware-trusted communication session by receiving a Radio Resource Control (RRC) hardware-trust indicator from a user communication device; and the control set of the VNFs executing on the NFVI processing circuitry and memory in the NFVI servers are configured to select the network bearer for the hardware-trusted communication session by identifying an Access Point Name (APN).

13. The data communication network of claim 11 wherein:
the control set of the VNFs executing on the NFVI processing circuitry and memory in the NFVI servers are configured to receive the communication request for the hardware-trusted communication session by receiving a Non-Access Stratum (NAS) hardware-trust indicator from a user communication device; and the control set of the VNFs executing on the NFVI processing circuitry and memory in the NFVI servers are configured to select the network bearer for the hardware-trusted communication session by identifying an Access Point Name (APN).

14. The data communication network of claim 11 wherein:
the control set of the VNFs executing on the NFVI processing circuitry and memory in the NFVI servers are configured to receive the communication request for the hardware-trusted communication session by receiving a Session Initiation Protocol (SIP) hardware-trust indicator from a user communication device; and the control set of the VNFs executing on the NFVI processing circuitry and memory in the NFVI servers are configured to select the network bearer for the hardware-trusted communication session by identifying an Access Point Name (APN).

15. The data communication network of claim 11 further comprising:
Software Defined Network (SDN) data machines;
the HT processing circuitry and memory in the HT server configured to exchange additional trust data with a hardware-trusted set of the Software Defined Network (SDN) data machines, and in response, the HT processing circuitry and memory in the HT server configured to maintain hardware trust in the hardware-trusted set of the SDN data machines;

the control set of the VNFs executing on the NFVI processing circuitry and memory in the NFVI servers are configured to indicate a data set of the SDN data machines to the HT server; and the HT processing circuitry and memory in the HT server configured to determine if the data set of the SDN data machines is in the hardware-trusted set of the SDN data machines and to indicate that the communication may proceed if both the data set of the VNFs is in the hardware-trusted set of the VNFs and if the data set of the SDN data machines is in the hardware-trusted set of the SDN data machines.

16. The data communication network of claim 11 further comprising:
wireless relays;
the HT processing circuitry and memory in the HT server configured to exchange additional trust data with a hardware-trusted set of the wireless relays, and in response, the HT processing circuitry and memory in the HT server configured to maintain hardware trust in the hardware-trusted set of the wireless relays;
the control set of the VNFs executing on the NFVI processing circuitry and memory in the NFVI servers are configured to indicate a data set of the wireless relays to the HT server; and
the HT processing circuitry and memory in the HT server configured to determine if the data set of the wireless relays is in the hardware-trusted set of the wireless relays and to indicate that the communication may proceed if both the data set of the VNFs is in the hardware-trusted set of the VNFs and if the data set of the wireless relays is in the hardware-trusted set of the wireless relays.

17. The data communication network of claim 11 further comprising:
the HT processing circuitry and memory in the HT server configured to exchange additional trust data with a hardware-trusted set of user communication devices, and in response, the HT processing circuitry and memory in the HT server configured to maintain hardware trust in the hardware-trusted set of the user communication devices;
the control set of the VNFs executing on the NFVI processing circuitry and memory in the NFVI servers are configured to indicate a data set of the user communication devices to the HT server; and
the HT processing circuitry and memory in the HT server configured to determine if the data set of the user communication devices is in the hardware-trusted set of the user communication devices and to indicate that the communication may proceed if both the data set of the VNFs is in the hardware-trusted set of the VNFs and if the data set of the user communication devices is in the hardware-trusted set of the user communication devices.

18. The data communication network of claim 11 wherein the VNFs comprise Long Term Evolution (LTE) VNFs.

19. The data communication network of claim 11 wherein the VNFs comprise Internet Protocol Multimedia Subsystem (IMS) VNFs.

20. The data communication network of claim 11 wherein the VNFs comprise Software Defined Network (SDN) VNFs.

* * * * *